US010215850B2

(12) United States Patent
Robinson

(10) Patent No.: US 10,215,850 B2
(45) Date of Patent: Feb. 26, 2019

(54) ORBITAL DETERMINATION (OD) OF GEOSYNCHRONOUS SATELLITES

(71) Applicant: Raytheon Company, Waltham, MA (US)

(72) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 1450 days.

(21) Appl. No.: 14/453,474

(22) Filed: Aug. 6, 2014

(65) Prior Publication Data

US 2016/0041267 A1     Feb. 11, 2016

(51) Int. Cl.
*G01S 11/02* (2010.01)
*G01S 11/10* (2006.01)
(Continued)

(52) U.S. Cl.
CPC ............. *G01S 11/026* (2013.01); *G01S 11/10* (2013.01); *G01S 13/003* (2013.01); *G01S 13/60* (2013.01)

(58) Field of Classification Search
CPC ....... G01C 21/24; G01S 11/10; G01S 11/026; G01S 13/60; G01S 13/003; G01S 19/42
(Continued)

(56) References Cited

U.S. PATENT DOCUMENTS 5,570,096 A    10/1996 Knight et al.
5,760,738 A    6/1998 Kawano
(Continued)

FOREIGN PATENT DOCUMENTS

EP    0844492 A1    5/1998
EP    0856957 A2    8/1998
(Continued)

OTHER PUBLICATIONS

J.D. Kronman, Experience Using GPS for Orbit Determination of a Geosynchronous Satellite, ION GPS 2000, p. 1622-1626, Sep. 2000.*

(Continued)

*Primary Examiner* — Bernarr E Gregory
*Assistant Examiner* — Fred H Mull

(57) ABSTRACT

Technology for determining an orbit of a geosynchronous satellite is described. A ground station can receive a transponded (RF) signal from a relay satellite. The relay satellite can receive an RF signal from the geosynchronous satellite and transpond the RF signal to create the transponded RF signal. The ground station can identify a second Doppler shift associated with the transponded RF signal received at the ground station from the relay satellite. The RF signal received at the relay satellite from the geosynchronous satellite can be associated with a first Doppler shift. The ground station can determine a frequency of the transponded RF signal received at the ground station from the relay satellite. The first Doppler shift associated with the RF signal transmitted from the geosynchronous satellite to the relay satellite can be calculated using the frequency of the transponded RF signal and the second Doppler shift associated with the transponded signal. The orbit of the geosynchronous satellite can be determined based on the first Doppler shift associated with the RF signal.

24 Claims, 6 Drawing Sheets

(51) Int. Cl.
*G01S 13/00* (2006.01)
*G01S 13/60* (2006.01)

(58) Field of Classification Search
USPC .......................................................... 701/531
See application file for complete search history.

(56) References Cited

U.S. PATENT DOCUMENTS

| | | | |
|---|---|---|---|
| 6,020,847 | A | 2/2000 | Upton et al. |
| 6,031,489 | A | 2/2000 | Wyrwas et al. |
| 6,107,959 | A | 8/2000 | Levanon |
| 6,147,644 | A | 11/2000 | Castles et al. |
| 6,307,503 | B1 | 10/2001 | Liu |
| 7,372,400 | B2 | 5/2008 | Cohen et al. |
| 8,019,541 | B2 | 9/2011 | Cohen et al. |
| 8,711,033 | B2 | 4/2014 | Calmettes et al. |
| 9,365,303 | B2 | 6/2016 | Robinson |
| 2011/0144911 | A1 | 6/2011 | Madhavan et al. |
| 2011/0254730 | A1 | 10/2011 | McBurney |
| 2014/0055299 | A1* | 2/2014 | Hwang .................. G01S 19/42 342/357.25 |

FOREIGN PATENT DOCUMENTS

| | | |
|---|---|---|
| WO | WO 99/40692 | 8/1999 |
| WO | WO 00/52495 | 9/2000 |
| WO | WO 2011/075707 A1 | 6/2011 |

OTHER PUBLICATIONS

D. Plaušinaitis, GPS Signal Acquisition, Danish GPS Center, Aalborg University, http://kom.aau.dk/~dpl/courses/mm11_slides.pdf, 2009.*

J. Van Sickle, Doppler Shift, GEOG 862: GPS and GNSS for Geospatial Professionals, The Pennsylvania State University, https://www.e-education.psu.edu/geog862/node/1786, 2017.*

K. Spindler, Tracking Types, Tracking Schedules, and the Orbit Determination Accuracy for Geostationary Spacecraft, Proceedings of the International Symposium on Space Technology and Science, vol. 20, p. 521-526, 1996 (Year: 1996).*

Anonymous, Doris; http://noppa.aalto.fi/noppa/kurssi/maa-6.3272/luennot/maa-6_3272_doris.prdf, Upon information and belief, available prior to May 3, 2012, 4 pages.

Boehme, Miniature Analog GOS Translator for Trident Reentry Body Accuracy Analysis, Johns Hopkins APL Technical Digest, 2010, pp. 133-140, vol. 29, No. 2.

Brunet et al., Doris Precise Orbit Determination and Localization System Description and USO's Performances, 1995 IEEE International Frequency Control Symposium, pp. 122-132.

Jayles et al., Ten centimeters orbits in real-time on-board of a satellite: DORIS-DIODE current status, ACTA Astronautica, Mar. 2004, pp. 315-323, Elsevier.

Lemoine et al., Three Decades of Precision Orbit Determination and its Vital Role to Oceanography, Jun. 19, 2008, 23 pages.

Levesque et al., Performance Issues Concerning Doppler-Only Localization of Submarine Targets, Saclantcen Report, Serial No. SR-325, Jul. 2000, 49 pages.

McCaskill et al., Doppler Only Navigation Using the Timation II Satellite [Unclassified Tide], NRL Report 7657, Dec. 3, 1973, 32 pages.

Stewart; Evolution of Military GPS; 21 pages; (the inventor believes that this was publicly available sufficiently earlier than the effective US filed and any foreign priority date).

Vetter, Fifty Years of Orbit Determination: Development of Modern Astrodynamics Methods, The Johns Hopkins APL Technical Digest, 2007, pp. 239-252, vol. 27, No. 3, Johns Hopkins University.

* cited by examiner

ORBITAL DETERMINATION (OD) OF GEOSYNCHRONOUS SATELLITES

BACKGROUND

Each satellite that orbits the Earth can have a distinct ephemeris. The ephemeris can include various types of information, such as the position or orbit of the satellite on a number of dates and times in a regular sequence. Some satellites can utilize knowledge of their orbit information for various applications. For example, a satellite's orbit information can be used to enhance the utility of altimeter and imaging system applications. In other cases, the operators of a satellite need to know its current position and orbital parameters to adjust the pointing of antennas or other sub-systems, or to adjust the orbit of the satellite to a more favorable location.

A significant number of satellites have orbits at or near zero degrees of inclination at an altitude that provides a 24 hour orbital period. These so called Geosynchronous Satellites (GS) appear to move little or none to observers on the ground. Orbit determination (OD) of satellites is typically computed by receiving 4 or more GPS signals.

Operators may uplink a signal from a ground station to the GS satellite and receive back a transponded, downlinked version of that signal. The time of flight of the uplink and downlink provide the operator range from the ground station to the GS satellite, but little other information on its orbital characteristics. Many observations, over an extended period of time (e.g. hours) must be made to estimate the orbit of the GS using the transponded signal.

Satellites that are not GS satellites may also receive an uplink from a ground station and transpond that signal back to the ground station. The signal received back at the ground will have appreciable Doppler shift compared to the original transmission. Multiple samples of the Doppler Shift can be used to estimate the orbit of the satellite. Unfortunately the Doppler Shift measured on the transponded signal from a GS will generally be too small to provide useful orbital information.

Satellites can communicate with ground stations fromr time to time. Some satellites, especially GS satellites, are in constant radio communication with one or more ground stations. Many GS satellites can broadcast additional radio signals to convey communications or to relay collected data to the ground.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
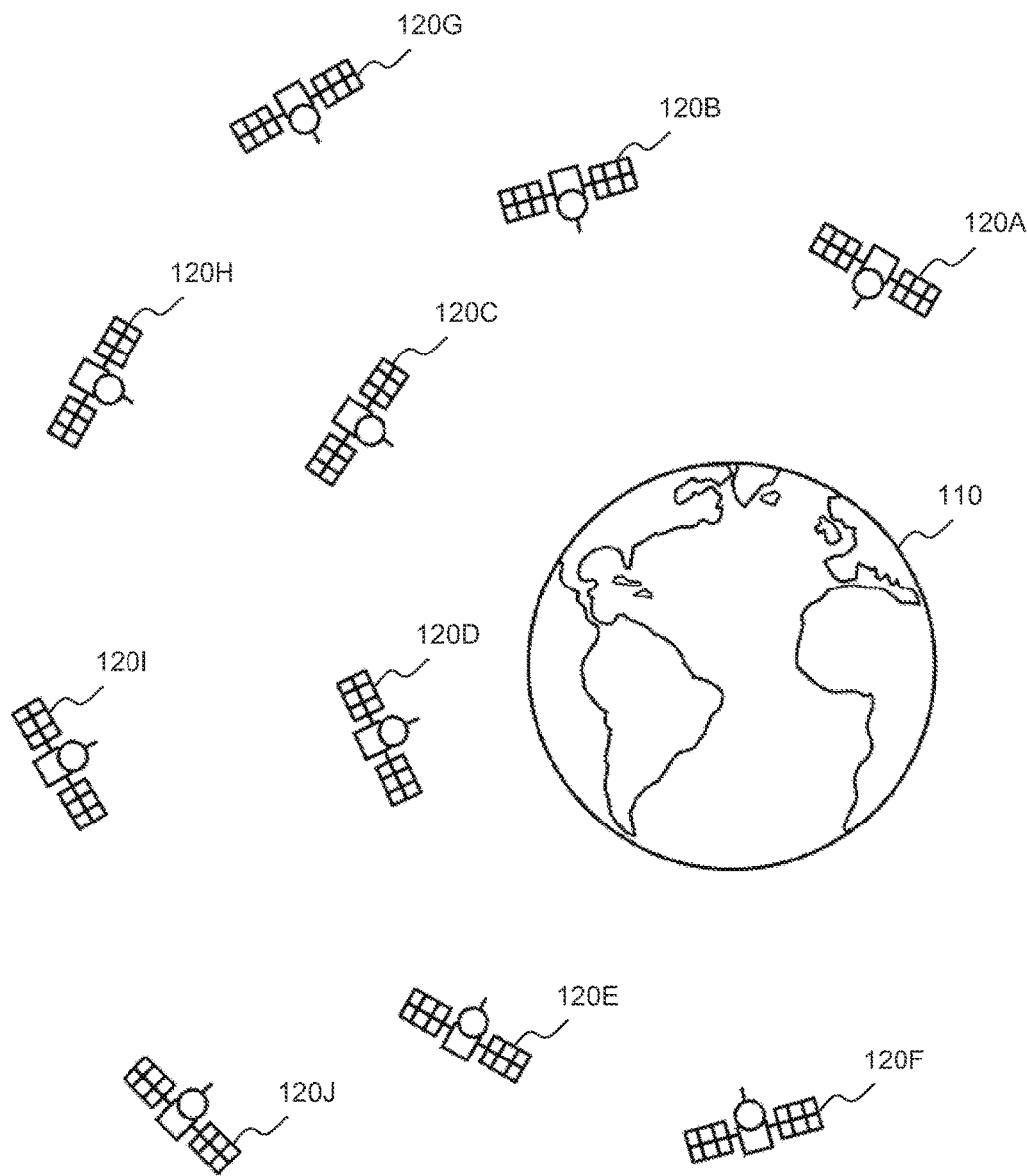
FIG. 1 illustrates a diagram of a plurality of global positioning system (GPS) satellites, a plurality of low Earth orbit (LEO) satellites, and a plurality of geosynchronous Earth orbit (GEO) satellites or high Earth orbit (HEO) satellites in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates a constellation of satellites 120A-J that orbit an Earth 110. The satellites 120A-J may include low Earth orbit (LEO) satellites, medium Earth orbit (MEO) satellites, high Earth orbit (HEO) satellites or geosynchronous Earth orbit (GEO) satellites. The satellites 120A-J may include cube satellites (CUBESATs), pico-satellites, nano-satellites, or micro-satellites, wherein the CUBESATs weigh less than 5 kilograms. The satellites 120A-J may include global positioning system (GPS) satellites, weather satellites, communication satellites, research satellites, reconnaissance satellites, etc.

LEO can generally be defined as an orbit within the locus extending from the Earth's surface 110 up to an altitude of approximately 2,000 kilometers (km). A GPS can operate with a constellation of GPS satellites (e.g., 24 GPS satellites). MEO can be a region of space around the Earth above the LEO (altitude of approximately 2,000 km or 1,243 miles (mi)) and below geostationary orbit (altitude of 35,786 km or 22,236 mi). The geosynchronous orbit, also known as the geosynchronous Earth orbit (GEO), can have a period approximately equal to the Earth's rotational period and an orbital eccentricity of approximately zero.

A GEO satellite can appear motionless (or slow-moving), at a fixed position in the sky, relative to ground observers. The GEO satellite can appear motionless to ground observers because the orbit of the GEO sateilite is substantially similar to that of the Earth's rotational period. A GEO satellite can have a near 24 hour orbit, or an orbit near the rotational rate of the Earth, hence geostationary Earth orbit (GEO). In an example, a MEO satellite can have an orbital altitude of approximately 20,000 km with a near 12 hour orbit.

In an example, the GPS signals can use the L1, L2, or L5 frequency band. The signal from a GPS satellite can be used to generate a measurement to calculate a receiver's position (i.e., the ground station's position). Each GPS signal can be used to solve for one unknown in the three dimensional (3D) position of the ground receiver (e.g., GPS receiver). The terms "ground receiver" and "ground station" may be used interchangeably herein. The GPS receiver can include a hand-held or portable receiver. Since a 3D position can have three unknowns, three independent signals from three separate GPS satellites can be used to calculate a 3D position. Since the GPS satellite and the GPS receiver do not operate using a same clock, a fourth independent signal from a fourth GPS satellite can be used to compensate for clock bias in the GPS receiver. So, measurements from the independent GPS signals from four different GPS satellites can be used to calculate a precise GPS receiver position. Sometimes more than four satellites may be in view of a GPS receiver, so additional GPS signals can provide redundancy or additional error checking for the measurements used to calculate the GPS receiver position.

Orbit determination (OD) generally refers to determining positions of satellites at a given time. OD capability for satellites can be provided when GPS is not fully available (e.g., fewer than 4 GPS satellites in view of the GPS receiver), where GPS signals may have regrets (e.g. multipath) or when at least a portion of the GPS constellation is unavailable. In an example, OD can be generated using a GPS signal from a single GPS satellite. OD using a single GPS satellite can be robust with partial GPS capability and may provide operationally responsive space systems to rapidly re-constitute OD capability when fewer than 4 GPS satellites are available. In another example, OD may be determined using a GPS signal (e.g., pseudo-random noise (PRN) code or CMDA code), where a single GPS satellite can provide OD for satellites in HEO and GEO orbits, which can have a low availability to receive GPS transmission from multiple GPS satellites past an Earth horizon.

In an example, orbit determination (e.g., estimating up to the 6 classical Kepler orbital elements) of moving platforms or vehicles can be provided by computing a trend in Doppler shift of a of a radio emission from a satellite. Generally this requires the receiver to know the original frequency of transmission A Doppler shift can be a change in a frequency of a wave for an observer, such as a receiver, moving relative to the source of the wave, such as a transmitter on a satellite. The motion of the observer, the source, or both can generate a change of the frequency. When the source of the waves is moving toward the observer, each successive wave crest is emitted from a position closer to the observer than the previous wave. Therefore, each wave takes slightly less time to reach the observer than the previous wave. Thus, the time between the arrivals of successive wave crests at the observer is reduced, causing an increase in the perceived frequency. Conversely, if the source of waves is moving away from the observer, each wave is emitted from a position farther from the observer than the previous wave, so the arrival time between successive waves is increased, reducing the perceived frequency.

Objects moving at greater velocities relative to each other can provide larger Doppler measurements than objects moving at slower velocities relative to each other. The time required to estimate the orbit of a satellite is proportional to the amount of Doppler shift and also the range separating the satellite and a receiver.

While current techniques for orbit determination (OD) of LEO satellites, MEO satellites and HEO satellites are generally rapid and precise, OD for GEO satellites has several obstacles.

In one example, OD can be performed by sending a radio frequency (RF) signal from a ground station to the satellite and transponding the RF signal back to the ground station. Ranging signals are typically used to determine the orbit of GEO satellites, rather than Doppler shift, because the GEO satellites exhibit almost no Doppler shift. In contrast, fast moving satellites can have a Doppler shift of dozens of kilohertz relative to the ground station, so Doppler shift can be used for OD of fast moving satellites. The ranging signals are typically applied for a time period ranging from a few hours to several days in order to achieve a convergence of the orbital solution. Although ranging signals enable for the computation of range from the ground station to the satellite, an appreciable Doppler shift in the satellite's signal may allow for convergence of the orbital solution to be more rapid and precise.

GEO satellites can transmit RF signals to the ground station. The GEO satellites can transmit the RF signals as a main mission function (e.g., a communications signal or a navigation signal) or for command, control, health or status purposes. These RF signals have almost no Doppler shift when received at the ground station. If the RF signals had an appreciable Doppler shift, then the ground station could use the Doppler shift and a known frequency of the RF signals to estimate the orbit of the GEO satellites. Therefore, as described herein, the Doppler shift of the RF signal from the GEO satellite or slow-moving satellite can be accelerated to produce an appreciable Doppler shift. The appreciable Doppler shift can be combined with range information to enable OD for GEO or slow-moving satellites.

Figure 2:
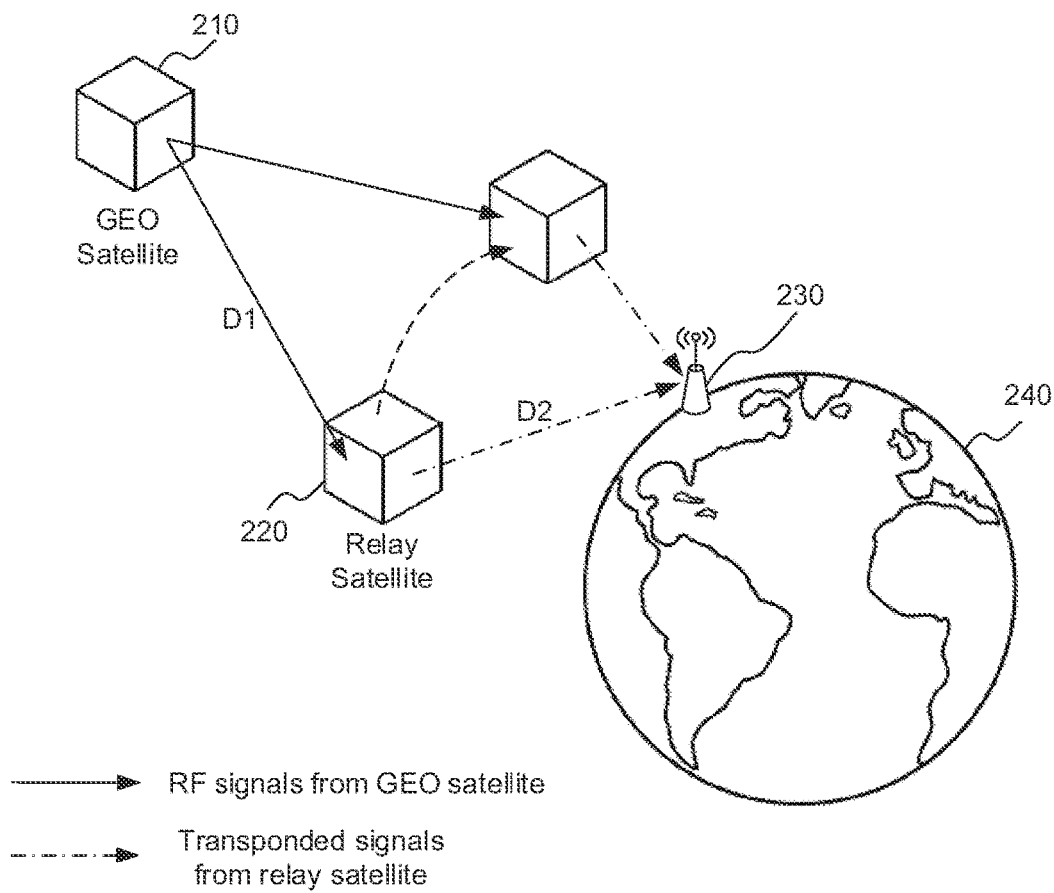
FIG. 2 illustrates a diagram of a ground station calculating Doppler shifts associated with radio frequency (RF) signals communicated between a geosynchronous satellite and a relay satellite and Doppler shifts associated with RF signals communicated between the relay satellite and the ground station in order to determine an orbit of the geosynchronous satellite in accordance with an example.

FIG. 2 illustrates a diagram of a ground station 230 determining an orbit or ephemeris of a geosynchronous Earth orbit (GEO) satellite 210 or other types of slow-moving satellites. The GEO satellite 210 may orbit the Earth 240. The ground station 230 on the Earth 240 may receive RF signals from the GEO satellite 210. In one example, a location of the ground station 230 can be known. In order to accelerate the Doppler shift of the RF signal communicated by the GEO satellite 210, a relay satellite 220 can be deployed in a lower orbit (e.g., a low Earth orbit (LEO)). The relay satellite 220 can have a relatively high angular rate relative to the GEO satellite 210. In other words, the relay satellite 220 can be in the LEO because of its relatively high rate of apparent motion with respect to both the GEO satellite 210 and the ground station 230. As described in further detail below, the relay satellite 220 can augment the Doppler shift of the RF signal that is ultimately received at the ground station 230. The ground station 230 can use the RF signal with the augmented Doppler shift to determine the orbit of the GEO satellite 210.

In one example, a trend in the Doppler shift of the RF signal can be unique to the GEO satellite's ephemeris relative to the relay satellite's ephemeris. The ground station 230 can determine the orbit of the GEO satellite 210 relative to the relay satellite 220. Since the orbit of the relay satellite 220 is known (e.g., based on an almanac or measured by the ground station), the orbit of the GEO satellite 210 can be determined.

The relay satellite 220 can be a cube satellite (CUBE-SAT), pica-satellite, nano-satellite, micro-satellite, or other similar type of small and/or inexpensive satellite. The CUBESAT can be a type of miniaturized satellite that can have a volume of approximately a liter (10 centimeter (cm) cube) with a weight less than 2 kilograms (kg). The CUBESAT can use commercial off-the-shelf electronics components. The picosatellite (or picosat) can refer to an artificial satellite with a wet mass between 0.1 and 1 kg (0.22 and 2.2 lb). The nanosatellite (or nanosat) can refer to an artificial satellite with a wet mass between 1 and 10 kilograms (kg) (2.2 and 22 pounds (lb)). A microsatellite (or rnicrosat) can refer to an artificial satellite with a wet mass between 10 and 100 kg (22 and 220 lb).

The relay satellite 220 can include various components capable of providing various functions, such a power source or a power generation mechanism, a mechanism to control heating and cooling of the relay satellite 220, and/or a mechanism to point a transmitter or antenna to the Earth. The power generation mechanism can include solar cells or panels. The power source can include a battery or capacitive device. The mechanism to control the heating and cooling of the relay satellite 220 may control the heating and cooling of the relay satellite 220 passively, so the mechanism does not require a power source to function properly. The mechanism to point the transmitter or antenna to the Earth may steer or rotate the position of the relay satellite 220 passively.

In one configuration, the GEO satellite 210 can communicate an RF signal to the relay satellite 220. The relay satellite 220 can receive the RF signal from the GEO satellite 210. The RF signal can be Doppler shifted from its original frequency of transmission proportional to the angular motion between the GEO satellite and the relay satellite. The relay satellite then shifts the frequency associated with the received RF signal, and transponds (transmits) the RF signal with the doubly shifted frequency to the ground station 230. The received signal is again Doppler shifted proportional to the angular motion between the relay satellite and the ground station. In other words, the relay satellite 220 can transpond or repeat the RF signal received from the GEO satellite 210 in order to create a transponded RF signal. The transponded RF signal can have a relatively high Doppler shift with respect to the RF signal originally communicated from the GEO satellite 210 to the relay satellite 220, which has a negligible amount of Doppler shift when received directly by the ground. The transponded RF signal can be received at the ground station 230.

The ground station 230 can identify a second Doppler shift (D2) associated with the transponded RF signal received at the ground station 230 from the relay satellite 220. The ground station 230 can identify the second Doppler shift using a known ephemeris (e.g., according to an almanac) of the relay satellite 220. A first Doppler shift (D1) can be associated with the RF signal received at the relay satellite 220 from the GEO satellite 210. The ground station 230 can measure a frequency (M1) of the transponded RF signal that is received at the ground station 230 from the relay satellite 220. In addition, the ground station 230 may know, such as according to an almanac, an initial frequency, It of the RF signal (i.e., the frequency of the RF signal communicated from the GEO satellite 210). The ground station 230 can remove the known frequency shift of the transponder, T1, from the initial frequency (I1), and then compare a remainder with the initial frequency, It to determine a total Doppler shift (i.e., D1+D2). In other words, D2 is known from the ephemeris of the relay satellite, so removing it from the remainder of data can reveal D1.

In one example, the ground station 230 can calculate the first Doppler shift (D1) associated with the RF signal transmitted from the GEO satellite 210 to the relay satellite 220 using the frequency of the transponded RF signal (M1) and the second Doppler shift (D2) associated with the transponded RF signal. In particular, the ground station 230 can calculate the first Doppler shift using D1=M1−D2. The ground station 230 can use the first Doppler shift (D1) to determine the orbit of the GEO satellite 210. In other words, the ground station 230 can remove the second Doppler shift associated with the RF signal communicated from the relay satellite 220 to the ground station 230 (i.e., D2) and processes a remaining Doppler shift (i.e., D1) in order to determine the orbit of the GEO satellite 210.

Thus, a transponded or repeated RF signal received at the ground station 230 from the relay satellite 220 can be double Doppler shifted from its original carrier (i.e., the GEO satellite 210). The first Doppler shift (D1) can occur when the RF signal is received at the relay satellite 220 and the second Doppler shift (D2) can occur when the RF signal is received at the ground station 230. The second Doppler shift (D2) can be known given the relay satellite's ephemeris and removed. A remaining Doppler shift and trend (i.e., D1) can be used to determine the orbit of the GEO satellite 210 given a known position of the ground station 230. The ground station 230 can use D1 when estimating a position (e.g., in X, Y and Z dimensions) and velocity (e.g., Vx, Vy, Vz) of the GEO satellite 210 relative to the relay satellite. Then in turn, the position and orbital elements of the GEO satellite can be determined using the known orbit of the relay satellite.

In one configuration, the first Doppler shift (D1) between the GEO satellite 210 and the relay satellite 220 can be represented by: $D1 = f_{Geo} - f_{relay}$, where $f_{Geo}$ is a frequency of an RF signal transmitted from the GEO satellite 210 and $f_{relay}$ is a frequency of a transponded signal transmitted from the relay satellite 220. The second Doppler shift (D2) between the relay satellite 220 and the ground station 230 can be represented by: $D2 = f_{relay} - f_{ground}$, where $f_{ground}$ (which is equivalent to M1) is a frequency of the transponded signal received at the ground station 230. Thus, the first Doppler shift (D1) can be represented by: $D1 = f_{Geo} - D2 - f_{ground}$. In this example, D2 can be calculated using a relay satellite ephemeris, $f_{ground}$ can be measured at the ground station 230, and $f_{Geo}$ is a known value.

In one configuration, the relay satellite 220 can receive the RE signal from the GEO satellite 210. The relay satellite 220 can calculate the Doppler shift (Le., D1) associated with the RE signal received from the GEO satellite 210. The relay satellite 220 can determine an orbit of the GEO satellite 210 using the Doppler shift. In other words, the relay satellite 220 can determine the GEO satellite's orbit rather than the ground station 230. The relay satellite 220 may communicate information about the GEO satellite's orbit to the ground station 230 periodically or upon request.

In yet another configuration, the relay satellite 220 can receive a plurality of RF signals from a plurality of GEO satellites. The relay satellite 220 can shift a frequency associated with each of the RF signals and then transpond the RF signals to the ground station 230. Therefore, OD can be performed by a single relay satellite for the plurality of GEO satellites.

In one example, the ground station 230 can use the first Doppler shift (D1) to determine classical orbital elements of the GEO satellite 210. The classical orbital elements can be the parameters required to uniquely identify a specific orbit. The classical orbital elements can include an eccentricity, semimajor axis, inclination, longitude of an ascending node, argument of periapsis, or mean anomaly at epoch. An ellipse can be used to represent an orbit. Two elements that can define a shape and size of an ellipse can be an eccentricity (e) and a semimajor axis (a). The eccentricity (e) can characterize a shape of the ellipse, such as describing elongation compared to a circle. The semimajor axis (a) can be the sum of the periapsis (i.e., perigee or perihelion) and apoapsis (i.e., apogee) distances divided by two. For circular orbits, the semimajor axis is the distance between the center of the bodies, not the distance of the bodies to the center of mass. The ellipse representing the orbit can be on an orbital plane.

Two elements that can define the orientation of the orbital plane of the ellipse can be an inclination (e.g., the equatorial plane) or a longitude of the ascending node ($\Omega$). The inclination represents the vertical tilt of the ellipse with respect to the reference plane, which can be measured at the ascending node (where the orbit passes upward through a reference plane or plane of the celestial equator (or ecliptic) when the Earth is used for the point of reference). Longitude of the ascending node ($\Omega$) can horizontally orient the ascending node of the ellipse (where the orbit passes upward through the reference plane) with respect to a reference point or the reference frame's vernal point, referred to as a vernal equinox.

The position of the satellite on the ellipse can be represented by an argument of periapsis ($\omega$) and a mean anomaly at epoch ($M_0$). The argument of periapsis ($\omega$) defines the orientation of the ellipse in the orbital plane, as an angle measured from the ascending node to the periapsis (i.e., a closest point the second body (e.g., Earth) comes to the first body (e.g., satellite) during an orbit). The mean anomaly at epoch ($M_0$) defines the position of the orbiting body (e.g., satellite) along the ellipse at a specific time (the "epoch").

In one example, the ground station 230 may determine an expected Doppler shift (e.g., an expected D1) associated with an upcoming RF signal to be transmitted from the GEO satellite 210 to the relay satellite 220. The ground station 230 may update estimates of the GEO satellite's position (e.g., in X, Y and Z dimensions) and velocity (e.g., Vx, Vy, Vz) until a measured Doppler shift is within a predetermined threshold of the expected Doppler shift.

Figure 3:
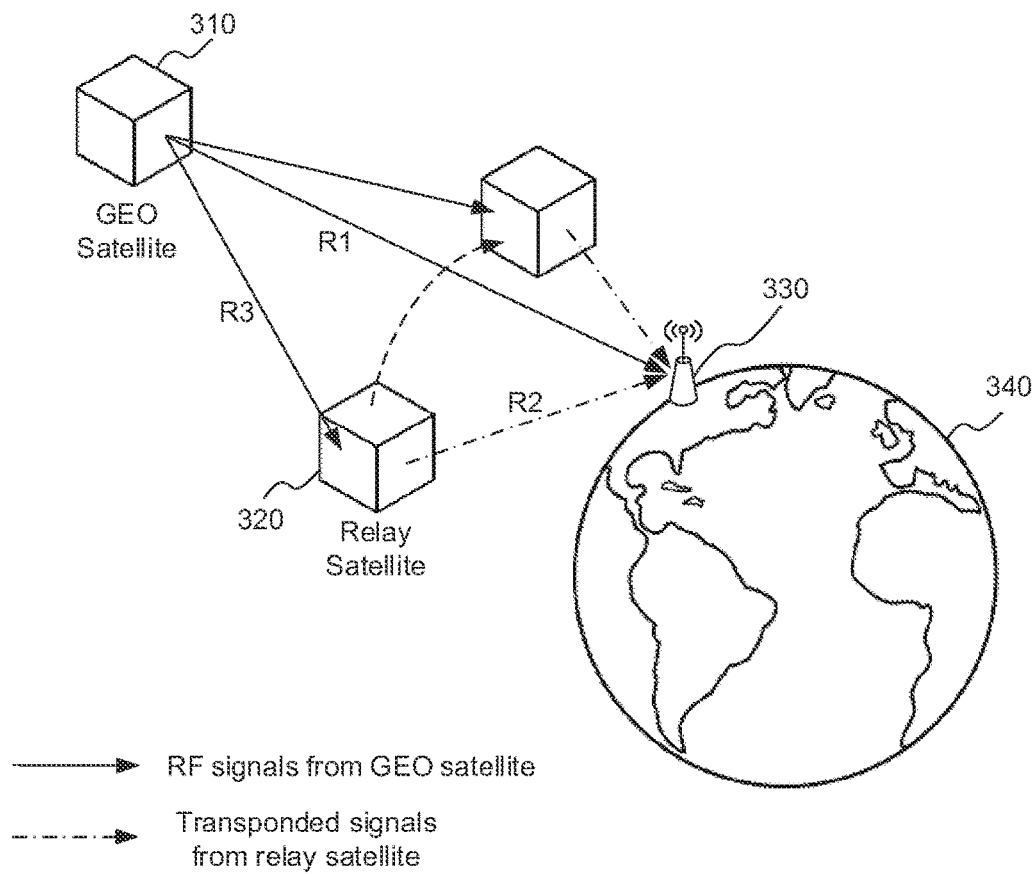
FIG. 3 illustrates a diagram of a ground station receiving direct radio frequency (RF) signals from a geosynchronous satellite and calculating range information associated with RF signals communicated between the geosynchronous satellite and a relay satellite and RF signals communicated between the relay satellite and the ground station in order to determine an orbit of the geosynchronous satellite in accordance with an example.

FIG. 3 illustrates a diagram of a ground receiver 330 determining an orbit or ephemeris of a geosynchronous (GEO) satellite 310 or other types of slow-moving satellites. The GEO satellite 310 may orbit the Earth 340. The ground receiver 330 on the Earth 340 may receive radio frequency (RF) signals from the GEO satellite 210, either directly or via a relay satellite 320. The relay satellite 320 can be deployed in a lower orbit (e.g., a low Earth orbit (LEO)) in order to accelerate (or augment) the Doppler shift of the RF signals communicated by the GEO satellite 310. The relay satellite 320 can have a relatively high angular rate relative to the GEO satellite 310. The ground receiver 330 can use the RF signal with the augmented Doppler shift and the RF signal received directly from the GEO satellite 310 in order to determine the orbit of the GEO satellite 310.

The ground receiver 330 can receive a first radio frequency (RF) signal directly from the GEO satellite 310. The ground receiver 330 can receive a second RF signal from the relay satellite 320. In one example, the second RF signal is a transponded RF signal. The relay satellite 320 can receive a third RF signal from the GEO satellite 310, shift a frequency associated with the third RF signal to create the second RF signal (i.e., the transponded RF signal), and send the second RF signal to the ground receiver 330.

In one configuration, the relay satellite 320 can sends its own tone or other signal to the ground receiver 330, rather than the transponded RF signal. The ground receiver 330 can use the tone or other signal to calibrate any frequency offset of the relay satellite 320.

In one example, a first range (R1) can represent a distance traveled by the first RF signal between the GEO satellite 310 and the ground receiver 330. A second range (R2) can represent a distance traveled by the second RF signal between the relay satellite 320 and the ground receiver 330. A third range (R3) can represent a distance traveled by the third RF signal between the GEO satellite 310 and the relay satellite 320.

The ground receiver 330 can calculate the second range (R2) using a measured amount of time for the second RF signal to travel from the relay satellite 320 and the ground receiver 330 and a speed of light (i.e., approximately 2.99× $10^8$ meters/second). The ground receiver 330 may calculate R2 because the orbit (i.e., ephemeris) of the relay satellite 320 is known, whereas the ground receiver 330 initially cannot calculate R1 and R3 because the orbit of the GEO satellite 310 is unknown.

The ground receiver 330 can determine the orbit of the GEO satellite 310 using $$\frac{R1}{c} = \frac{R3 + R2}{c} - \tau + d,$$

wherein c is the speed of light. In addition, d can be a known value and represent an amount of time for the relay satellite 320 to receive the third RF signal from the GEO satellite 310, shift a frequency associated with the third RF signal to create the second RF signal, and send the second RF signal to the ground receiver 330.

In one example, $\tau$ can represent a time lag between the ground receiver 330 receiving the second RF signal from the relay satellite 320 with respect to receiving the first RF signal directly from the GEO satellite 310. In other words, the ground receiver 330 can receive the direct RF signal from the GEO satellite 310 (i.e., corresponding with R1) and receive the transponded RF signal from the relay satellite 320 (i.e., corresponding with R2). The ground receiver 330 can remove a carrier from each measurement so that the direct RF signals and transponded RF signals are on a common carrier (i.e., the signals are at a common frequency). A correlation operation comparing the direct RF signals and the transponded RF signals provides the time lag, $\tau$, as a function of time between the RF signals. The direct RF signal can be propagated over a shorter distance as compared with the RF signal that is communicated to the relay satellite 320 and then relayed to the ground receiver 330.

The ground receiver 330 can measure $\tau$, correlating the signals as described above. R2 can be known to the ground receiver 330 because the ephemeris of the relay satellite 320 is known. Therefore, the ground receiver 330 can use $$\frac{R1}{c} = \frac{R3 + R2}{c} - \tau + d$$

to obtain a relationship between R1 and R3. The relationship between R1 and R3 can be represented as K(t)=R1−R3, wherein R3 can change over time faster than R1. in other words, K(t) is known to the ground receiver 330, but specific values for R1 and R3 are unknown. The relationship between R1 and R3 can increase a speed to a convergence of the orbital determination (OD) for the GEO satellite 310. The ground receiver 330 can determine the orbit of the GEO satellite 310 relative to an orbit of the relay satellite 320, wherein the orbit of the relay satellite 320 is previously determined (i.e., the ephemeris of the relay satellite 320 is known).

In one configuration, the ground receiver 330 may receive a dedicated tone from the relay satellite 320 and calculate the ephemeris of the relay satellite 320 using the dedicated tone. Alternatively, the relay satellite 320 can transmit two or more tones to the ground receiver 330 to enable the ground receiver 330 to perform an empirical correction of delays (e.g., due to an ionosphere) using a $$\frac{1}{f^2}$$

scaling rule.

In one example, the ground receiver 330 can identify a second Doppler shift (D2) associated with the second RF signal received at the ground receiver 330 from the relay satellite 320. The ground receiver 330 can identify the second Doppler shift based on a known ephemeris of the relay satellite 320. The ground receiver can measure a frequency (M1) of the second RF signal received from the relay satellite 320. The ground receiver 330 can calculate a first Doppler shift (D1) associated with the third RF signal transmitted from the GEO satellite 310 to the relay satellite 320 using the frequency of the second RF signal (M1) and the second Doppler shift (D2) associated with the second RF signal. In particular, the ground receiver 330 may use D1=M1−D2 in order to determine D1. The ground receiver 330 can determine the orbit of the GEO satellite 310 (e.g., X, Y, Z, Vx. Vy, and Vz of the GEO satellite 310) using the first Doppler shift (D1) and the predefined relationship between the first range and the third range (i.e., K(t)=R1−R3).

In another example, the ground receiver 330 may know, such as according to an almanac, an initial frequency, I1, of the RF signal (i.e., the frequency of the RF signal communicated from the GEO satellite 310). The ground receiver 330 can remove the known frequency shift of the transponder, T1, from the initial frequency (I1), and then compare a remainder with the initial frequency, I1, to determine a total Doppler shift (i.e., D1+D2). In other words, D2 is known from the ephemeris of the relay satellite, so removing it from the remainder of data can reveal D1.

In one configuration, the ground receiver 330 can determine an expected Doppler shift (D1) associated with an upcoming third RF signal to be transmitted from the GEO satellite 310 to the relay satellite 320. The ground receiver 330 can determine an expected time lag between receiving an upcoming second RF signal, at the ground receiver 330 from the relay satellite 320, with respect to receiving an upcoming first RF signal from the GEO satellite 310. The ground receiver 330 can update estimates of the GEO satellite's position (i.e., X, Y, and Z) and velocity (i.e., Vx, Vy, and Vz) until a measured Doppler shift (D1) is within a predetermined threshold of the expected Doppler shift (D1) and a measured time lag is within a predetermined threshold of the expected time lag.

Figure 4:
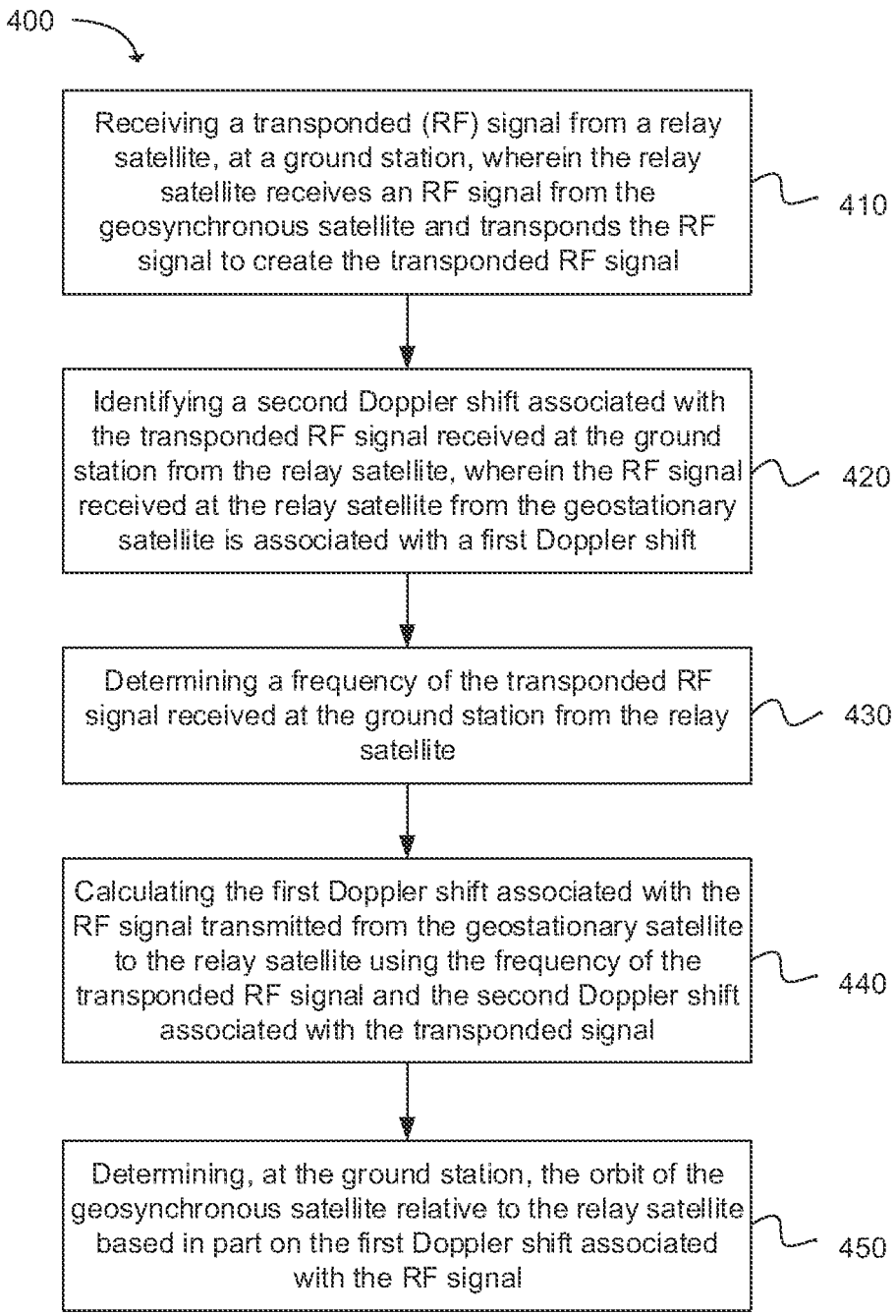
FIG. 4 depicts a flow chart of a method for determining an orbit of a geosynchronous satellite in accordance with an example.

FIG. 4 depicts a flow chart of a method 400 for determining an orbit of a geosynchronous satellite. A transponded (RF) signal from a relay satellite can be received, at a ground station, wherein the relay satellite receives an RF signal from the geosynchronous satellite and transponds the RF signal to create the transponded RF signal, as in block 410. A second Doppler shift associated with the transponded RF signal received at the ground station from the relay satellite can be identified, wherein the RF signal received at the relay satellite from the geosynchronous satellite is associated with a first Doppler shift, as in block 420. A frequency of the transponded RF signal received at the ground station from the relay satellite can be determined, as in block 430. The first Doppler shift associated with the RF signal transmitted from the geosynchronous satellite to the relay satellite can be calculated using the frequency of the transponded RF signal and the second Doppler shift associated with the transponded signal, as in block 440. The orbit of the geosynchronous satellite can be determined based on the first Doppler shift associated with the RF signal, as in block 450.

Figure 5:
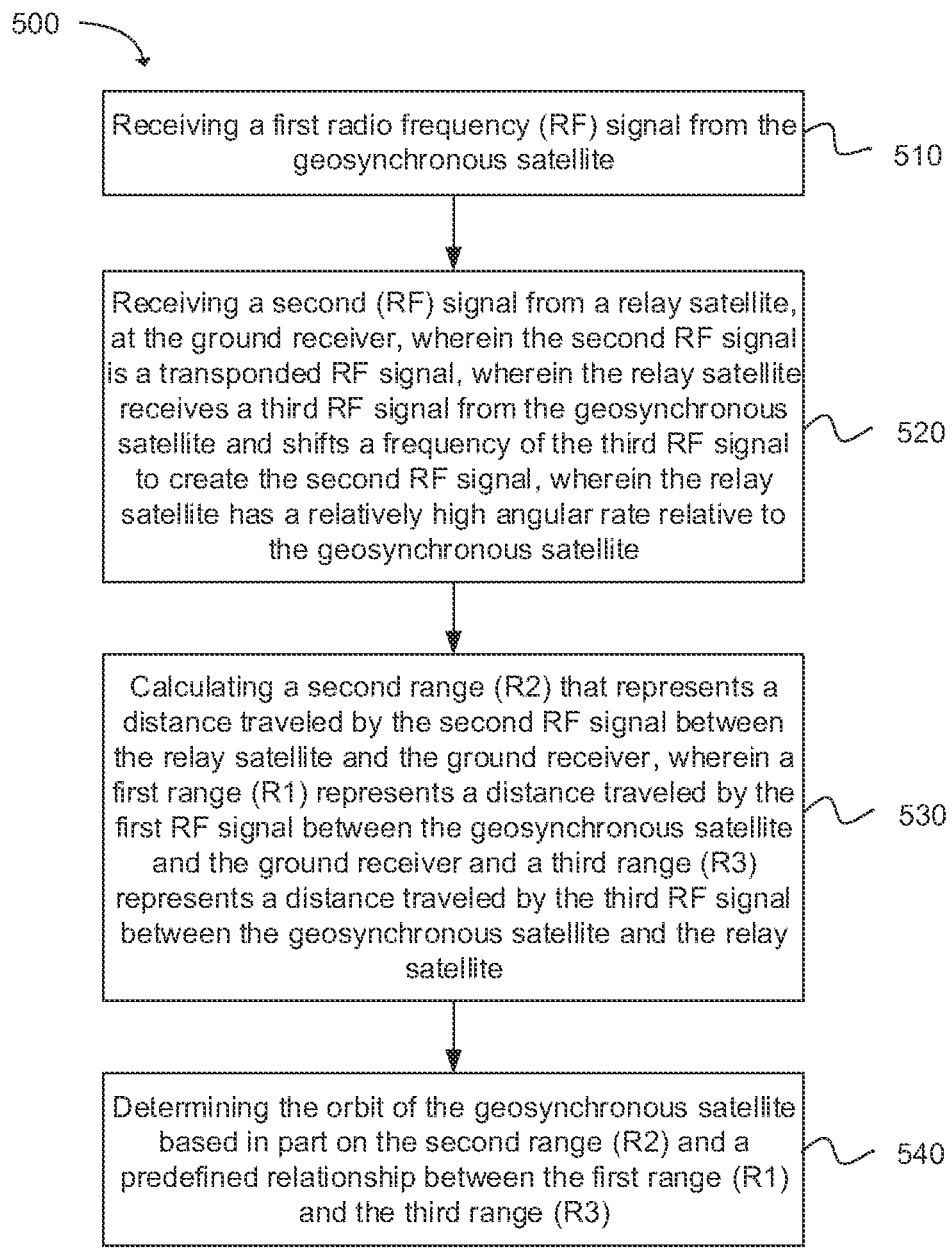
FIG. 5 depicts functionality of computer circuitry of a ground receiver operable to determine an orbit of a geosynchronous satellite in accordance with an example.

FIG. 5 depicts a flow chart of a method 500 for determining an orbit of a geosynchronous satellite. A first radio frequency (RF) signal can be received from the geosynchronous satellite, as in block 510. A second (RF) signal can be received from a relay satellite, at the ground receiver, wherein the second RF signal is a transponded RF signal, wherein the relay satellite receives a third RF signal from the geosynchronous satellite and shifts a frequency of the third RF signal to create the second RF signal, wherein the relay satellite has a relatively high angular rate relative to the geosynchronous satellite, as in block 520. A second range (R2) can be calculated that represents a distance traveled by the second RF signal between the relay satellite and the ground receiver, wherein a first range (R1) represents a distance traveled by the first RF signal between the geosynchronous satellite and the ground receiver and a third range (R3) represents a distance traveled by the third RF signal between the geosynchronous satellite and the relay satellite, as in block 530. The orbit of the geosynchronous satellite can be determined based on the second range (R2) and a predefined relationship between the first range (R1) and the third range (R3), as in block 540.

Figure 6:
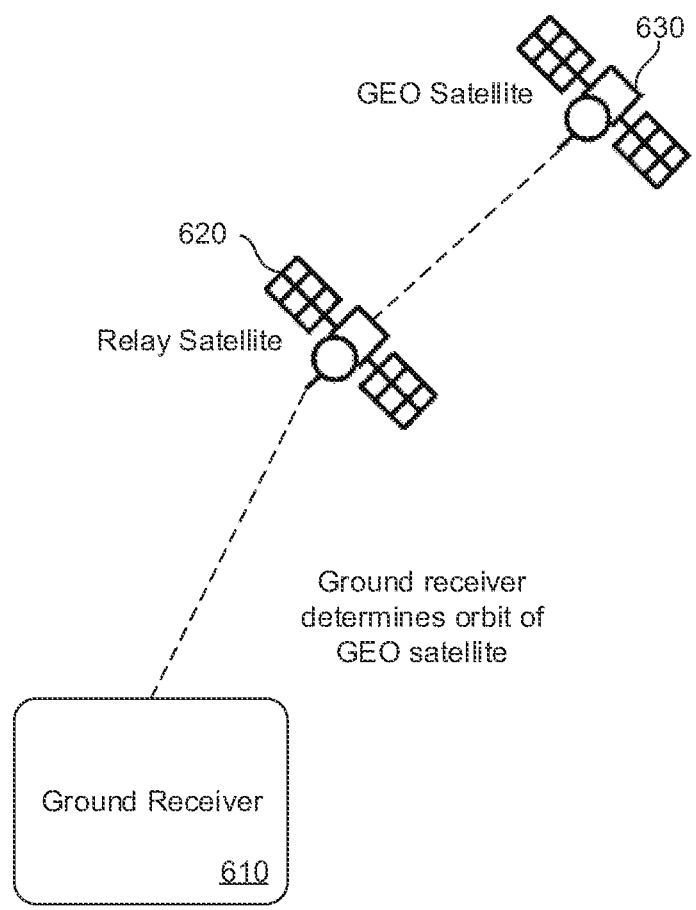
FIG. 6 depicts a system for satellite orbit determination in accordance with an example.

FIG. 6 depicts an exemplary system for satellite orbit determination. A geosynchronous Earth orbit (GEO) satellite 630 can be configured to generate a radio frequency (RF) signal. A relay satellite 620 can be configured to receive the RF signal from the geosynchronous satellite 630 and generate a transponded RF signal from the RF signal, wherein the relay satellite 620 has a relatively high angular rate relative to the geosynchronous satellite 630. A ground receiver 610 can be configured to receive the transponded RF signal from the relay satellite 620 and determine the orbit of the geosynchronous satellite 630 based on a first Doppler shift associated with the RF signal. In one example, the ground receiver 610 can be further configured to calculate a second Doppler shift associated with the transponded RF signal received at the ground receiver 610 from the relay satellite 620, wherein the RF signal received at the relay satellite 620 from the geosynchronous satellite 630 is associated with a first Doppler shift; and calculate the first Doppler shift associated with the RF signal transmitted from the geosynchronous satellite 630 to the relay satellite 620 using a frequency of the transponded RF signal received at the ground receiver 610 from the relay satellite 620 and the second Doppler shift associated with the transponded signal.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The satellite may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for determining an orbit of a geosynchronous satellite, the method comprising:
   under control of at least one processor and memory configured with executable instructions:
   receiving a transponded (RF) signal from a relay satellite, at a ground station, wherein the relay satellite receives an RF signal having a first Doppler shift from the geosynchronous satellite and transponds the RF signal to create the transponded RF signal;
   calculating a second Doppler shift that is associated with the transponded RF signal received at the ground station from the relay satellite;
   determining a frequency of the transponded RF signal that is received at the ground station from the relay satellite, wherein the frequency is a received frequency of the transponded RF signal;
   calculating the first Doppler shift associated with the RF signal using the frequency of the transponded RF signal and the second Doppler shift;
   computing, at the ground station, a trend in a Doppler shift based on multiple RF signals from the geosynchronous satellite, wherein the trend in the Doppler shift includes multiple Doppler shifts that include the first Doppler shift;

determining, at the ground station, the orbit of the geosynchronous satellite relative to the relay satellite using the trend in the Doppler shift; and adjusting the orbit of the geosynchronous satellite that is determined using the trend in the Doppler shift, wherein a location of the ground station and an orbit of the relay satellite are known to the ground station.

2. The method of claim 1, wherein the transponded RF signal, received at the ground station from the relay satellite, has a shifted frequency with respect to the RF signal communicated from the geosynchronous satellite to the relay satellite.

3. The method of claim 1, further comprising determining the orbit of the geosynchronous satellite relative to an orbit of the relay satellite, wherein the orbit of the relay satellite is previously determined.

4. The method of claim 1, wherein the relay satellite has an angular rate around the Earth that is higher than an angular rate around the Earth of the geosynchronous satellite.

5. The method of claim 1, wherein the step of calculating the first Doppler shift further comprises using $D1 = f_{Geo} - D2 - f_{ground}$, wherein D1 represents the first Doppler shift, D2 represents the second Doppler shift, $f_{Geo}$ is a frequency of the RF signal transmitted from the geosynchronous satellite and $f_{ground}$ is a frequency of the transponded RF signal that is received at the ground station from the relay satellite, wherein D2 is calculated using a relay satellite ephemeris, $f_{ground}$ is measured at the ground station, and $f_{Geo}$ is a known value.

6. The method of claim 1, further comprising identifying the second Doppler shift associated with the transponded RF signal received at the ground station from the relay satellite based on a known ephemeris associated with the relay satellite.

7. The method of claim 1, further comprising using the first Doppler shift associated with the RF signal transmitted from the geosynchronous satellite to the relay satellite to determine six classical orbital elements of the geosynchronous satellite, the six classical elements including an eccentricity, semimajor axis, inclination, longitude of an ascending node, argument of periapsis, and mean anomaly at epoch.

8. The method of claim 7, further comprising:
determining, at the ground station, an expected Doppler shift associated with an upcoming RF signal to be transmitted from the geosynchronous satellite to the relay satellite; and
updating the current position and the current velocity associated with the geosynchronous satellite until a measured Doppler shift is within a predetermined threshold of the expected Doppler shift.

9. The method of claim 1, wherein the relay satellite is a cube satellite (CubeSat) or a micro satellite.

10. A method for determining an orbit of a geosynchronous satellite, the method comprising:
under control of at least one processor and memory configured with executable instructions:
receiving a first radio frequency (RF) signal from the geosynchronous satellite;
receiving a second (RF) signal from a relay satellite, at the ground receiver, wherein the second RF signal is a transponded RF signal, wherein the relay satellite receives a third RF signal from the geosynchronous satellite and shifts a frequency of the third RF signal to create the second RF signal, wherein the relay satellite has an angular rate around the Earth that is higher than an angular rate around the Earth of the geosynchronous satellite;
calculating a second range (R2) that represents a distance traveled by the second RF signal between the relay satellite and the ground receiver, wherein a first range (R1) represents a distance traveled by the first RF signal between the geosynchronous satellite and the ground receiver and a third range (R3) represents a distance traveled by the third RF signal between the geosynchronous satellite and the relay satellite;
determining the orbit of the geosynchronous satellite based in part on the second range (R2) and a predefined relationship between the first range (R1) and the third range (R3) at a given time, wherein the orbit of the geosynchronous satellite is determined using multiple second range (R2) measurements calculated over a period of time; and
adjusting the orbit of the geosynchronous satellite that is determined using the multiple second range (R2) measurements calculated over the period of time,
wherein a location of the ground station and an orbit of the relay satellite are known to the ground station.

11. The method of claim 10, further comprising determining the orbit of the geosynchronous satellite using $K(t) = R1 - R3$, wherein $K(t)$ represents the predefined relationship between the first range and the third range.

12. The method of claim 11, further comprising determining the orbit of the geosynchronous satellite using $$\frac{R1}{c} = \frac{R3 + R2}{c} - \tau + d,$$

wherein:
c is the speed of light;
$\tau$ represents a time lag between the ground receiver receiving the second RF signal from the relay satellite with respect to receiving the first RF signal from the geosynchronous satellite; and
d represents an amount of time for the relay satellite to receive the third RF signal from the geosynchronous satellite, shift a frequency associated with the third RF signal to create the second RF signal, and send the second RF signal to the ground receiver.

13. The method of claim 11, wherein the predefined relationship of $K(t) = R1 - R3$ increases a speed for convergence of orbit determination of the geosynchronous satellite.

14. The method of claim 11, further comprising determining the orbit of the geosynchronous satellite relative to an orbit of the relay satellite, wherein the orbit of the relay satellite is previously determined.

15. The method of claim 11, further comprising:
calculating a second Doppler shift associated with the second RF signal received at the ground receiver from the relay satellite;
measuring a frequency of the second RF signal received from the relay satellite;
calculating a first Doppler shift associated with the third RF signal transmitted from the geosynchronous satellite to the relay satellite using the frequency of the second RF signal and the second Doppler shift associated with the second RF signal; and
determining the orbit of the geosynchronous satellite based on the first Doppler shift, the second range (R2), and the predefined relationship between the first range and the third range.

16. The method of claim 10, further comprising calculating the second range (R2) that represents the distance traveled by the second RF signal between the relay satellite and the ground receiver using a known ephemeris associated with the relay satellite.

17. The method of claim 10, further comprising:
receiving at least one dedicated tone from the relay satellite; and
calculating the ephemeris of the relay satellite using the at least one dedicated tone.

18. The method of claim 10, further comprising:
determining, at the ground receiver, an expected Doppler shift associated with an upcoming third RF signal to be transmitted from the geosynchronous satellite to the relay satellite;
determining, at the ground receiver, an expected time lag between the ground receiver receiving an upcoming second RF signal from the relay satellite with respect to receiving an upcoming first RF signal from the geosynchronous satellite; and
updating an orbital determination of the geosynchronous satellite until a measured Doppler shift is within a predetermined threshold of the expected Doppler shift and a measured time lag is within a predetermined threshold of the expected time lag.

19. A system for satellite orbit determination, the system comprising:
a geosynchronous satellite configured to generate a radio frequency (RF) signal;
a relay satellite configured to receive the RF signal from the geosynchronous satellite and generate a transponded RF signal from the RF signal, wherein the relay satellite has an angular rate around the Earth that is higher than an angular rate around the Earth of the geosynchronous satellite; and
a ground receiver configured to:
receive the transponded RF signal from the relay satellite;
compute a trend in a Doppler shift based on multiple RF signals from the geosynchronous satellite, wherein the trend in the Doppler shift includes multiple Doppler shifts that includes a first Doppler shift associated with the RF signal; and
determine the orbit of the geosynchronous satellite using the trend in the Doppler shift,
wherein a location of the ground station and an orbit of the relay satellite are known to the ground station.

20. The system of claim 19, wherein the ground receiver is further configured to:
calculate a second Doppler shift associated with the transponded RF signal received at the ground receiver from the relay satellite, wherein the RF signal received at the relay satellite from the geosynchronous satellite is associated with the first Doppler shift; and
calculate the first Doppler shift associated with the RF signal transmitted from the geosynchronous satellite to the relay satellite using a frequency of the transponded RF signal that is received at the ground receiver from the relay satellite and the second Doppler shift associated with the transponded signal, wherein the frequency is a received frequency of the transponded signal.

21. The system of claim 19, wherein the ground receiver is further configured to determine six classical orbital elements of the geosynchronous satellite based on the first Doppler shift associated with the RF signal transmitted from the geosynchronous satellite to the relay satellite.

22. The system of claim 19, wherein the ground receiver is further configured to determine a current position and current velocity associated with the geosynchronous satellite based on the first Doppler shift associated with the RF signal transmitted from the geosynchronous satellite to the relay satellite.

23. The system of claim 19, wherein the relay satellite is further configured to receive the RF signal from the geosynchronous satellite, shift a frequency associated with the RF signal in order to create transponded RF signal, and send the transponded RF signal to the ground receiver.

24. A method for determining an orbit of a geosynchronous satellite, the method comprising:
under control of at least one processor and memory configured with executable instructions:
receiving a transponded (RF) signal from a relay satellite, at a ground station, wherein the relay satellite receives an RF signal having a first Doppler shift from the geosynchronous satellite and transponds the RF signal to create the transponded RF signal;
calculating a second Doppler shift that is associated with the transponded RF signal received at the ground station from the relay satellite;
determining a frequency of the transponded RF signal that is received at the ground station from the relay satellite, wherein the frequency is a received frequency of the transponded RF signal;
calculating the first Doppler shift associated with the RF signal using the frequency of the transponded RF signal and the second Doppler shift;
computing, at the ground station, a trend in a Doppler shift based on multiple RF signals from the geosynchronous satellite, wherein the trend in the Doppler shift includes multiple Doppler shifts that include the first Doppler shift;
determining, at the ground station, the orbit of the geosynchronous satellite relative to the relay satellite using the trend in the Doppler shift; and
adjusting a direction of one or more antennas associated with the ground station based on the orbit of the geosynchronous satellite determined using the trend in the Doppler shift,
wherein a location of the ground station and an orbit of the relay satellite are known to the ground station.

* * * * *